(12) United States Patent
Shi

(10) Patent No.: US 12,275,488 B2
(45) Date of Patent: Apr. 15, 2025

(54) TRAVELING APPARATUS

(71) Applicant: NINEBOT (HANGZHOU) TECH CO. LTD., Hangzhou (CN)

(72) Inventor: Anxin Shi, Beijing (CN)

(*) Notice: Subject to any disclaimer, the term of this patent is extended or adjusted under 35 U.S.C. 154(b) by 379 days.

(21) Appl. No.: 17/799,360

(22) PCT Filed: Jan. 29, 2021

(86) PCT No.: PCT/CN2021/074518
§ 371 (c)(1),
(2) Date: Aug. 12, 2022

(87) PCT Pub. No.: WO2021/159978
PCT Pub. Date: Aug. 19, 2021

(65) Prior Publication Data
US 2023/0069532 A1    Mar. 2, 2023

(30) Foreign Application Priority Data
Feb. 14, 2020  (CN) .......................... 202020170522.7

(51) Int. Cl.
*B62L 1/04* (2006.01)
*B60T 1/04* (2006.01)
(Continued)

(52) U.S. Cl.
CPC .................. *B62L 1/04* (2013.01); *B60T 1/04* (2013.01); *B62L 3/02* (2013.01); *F16D 65/28* (2013.01);
(Continued)

(58) Field of Classification Search
CPC . B60T 1/04; B60L 1/04; B62B 5/0438; B62B 5/0447; B62B 5/0485; B62L 3/02;
(Continued)

(56) References Cited

U.S. PATENT DOCUMENTS 3,252,713 A * 5/1966 Heller .................. A63C 17/014
188/20
5,452,775 A * 9/1995 Bussinger ............... F16D 59/00
188/29

(Continued)

FOREIGN PATENT DOCUMENTS

CN         2425841 Y     4/2001
CN       202107065 U     1/2012
(Continued)

OTHER PUBLICATIONS

International Search Report and Written Opinion dated Apr. 21, 2021 for Application No. PCT/CN2021/074518, 11 pages.

*Primary Examiner* — Thomas J Williams
(74) *Attorney, Agent, or Firm* — FROST BROWN TODD LLP

(57) ABSTRACT

A traveling apparatus includes a frame, a wheel body, a rotating shaft, and a brake assembly. The wheel body is rotatably arranged on the frame, and is configured to roll on a bearing surface. The rotating shaft is connected to the frame, and the brake assembly is rotatably arranged on the rotating shaft. On a rotation path of the brake assembly, the brake assembly has an idle position in which the brake assembly defines a gap with a working surface of the wheel body, and a brake position in which the brake assembly is (Continued)

configured to be in contact with the working surface of the wheel body. The working surface is a surface of the wheel body configured to be in contact with the bearing surface.

15 Claims, 6 Drawing Sheets

(51) Int. Cl.
*B62L 3/02* (2006.01)
*F16D 65/28* (2006.01)
*F16D 121/14* (2012.01)
*F16D 125/60* (2012.01)

(52) U.S. Cl.
CPC ...... *F16D 2121/14* (2013.01); *F16D 2125/60* (2013.01)

(58) Field of Classification Search
CPC ... F16D 65/28; F16D 2121/14; F16D 2125/60
USPC ............................ 188/16, 19, 20, 21, 22, 29
See application file for complete search history.

(56) References Cited

U.S. PATENT DOCUMENTS

| | | | | |
|---|---|---|---|---|
| 5,927,441 A * | 7/1999 | Luo | ........................... | B62L 3/02 |
| | | | | 74/489 |
| 6,120,044 A * | 9/2000 | Tsai | ..................... | B62K 15/006 |
| | | | | 280/87.041 |
| 6,409,187 B1 * | 6/2002 | Crow, Jr. | .................. | B62B 5/04 |
| | | | | 188/29 |
| 6,435,528 B1 * | 8/2002 | Tsai | ....................... | B62K 3/002 |
| | | | | 280/87.041 |
| 2005/0115776 A1 * | 6/2005 | Doerflinger | ............. | B60T 17/18 |
| | | | | 188/19 |
| 2011/0061979 A1 * | 3/2011 | Tai | ........................ | B62B 5/0485 |
| | | | | 188/22 |
| 2023/0069532 A1 * | 3/2023 | Shi | .......................... | F16D 65/28 |

FOREIGN PATENT DOCUMENTS

| | | |
|---|---|---|
| CN | 202657178 U | 1/2013 |
| CN | 110606159 A | 12/2019 |
| CN | 211844772 U | 11/2020 |
| JP | S-50115356 U | 9/1975 |
| KR | 10-2051778 B1 | 12/2019 |

* cited by examiner

TRAVELING APPARATUS

CROSS-REFERENCE TO RELATED APPLICATION

The present application is a National Stage of International Application No. PCT/CN2021/074518, filed on Jan. 29, 2021, which claims the benefit of priority to Chinese Application No. 202020170522.7, filed on Feb. 14, 2020, both of which are incorporated by reference herein in their entireties for all purposes.

TECHNICAL FIELD

The present disclosure relates to a traveling apparatus.

BACKGROUND

A scooter is a common transportation tool in people's life. Because of its small structure, the scooter has become a commonly used short-distance transportation tool. However, the scooter in the related art does not have a brake structure, and an operator needs to directly step on a mudguard to brake. The stepping by the operator on the mudguard causes the scooter to shake, which has potential safety hazards.

SUMMARY

The embodiments of a first aspect of the present disclosure provide a traveling apparatus including a frame, a wheel body, a rotating shaft, and a brake assembly. The wheel body is rotatably arranged on the frame, and is configured to roll on a bearing surface. The rotating shaft is connected to the frame, and the brake assembly is arranged on the rotating shaft and configured to rotate relative to the frame. On a rotation path of the brake assembly, the brake assembly has an idle position in which the brake assembly defines a gap with a working surface of the wheel body, and a brake position in which the brake assembly is configured to be in contact with the working surface of the wheel body. The working surface is a surface of the wheel body configured to be in contact with the bearing surface.

The embodiments of a second aspect of the present disclosure provide a traveling apparatus including a frame, a wheel body, a rotating shaft, and a brake assembly. The wheel body rotatably is arranged on the frame, and configured to roll on a bearing surface. The rotating shaft is fixedly connected to the frame. The brake assembly is rotatably arranged on the rotating shaft. The brake assembly has an idle position in which the brake assembly is spaced apart from a surface of the wheel body configured to be in contact with the bearing surface, and a brake position in which the brake assembly abuts against the surface of the wheel body.

The embodiments of a third aspect of the present disclosure provide a traveling apparatus including a frame, a wheel body, a rotating shaft, and a brake assembly. The wheel body is rotatably arranged on the frame, and configured to roll on a bearing surface. The rotating shaft is connected to the frame. The brake assembly is arranged on the rotating shaft and configured to rotate relative to the frame. The brake assembly is configured to be spaced apart from a working surface of the wheel body when the traveling apparatus is in a normal travelling state, and to abut against the working surface of the wheel body when the traveling apparatus is in a braking state. The working surface is a surface of the wheel body configured to be in contact with the bearing surface.

DETAILED DESCRIPTION

Figure 1:
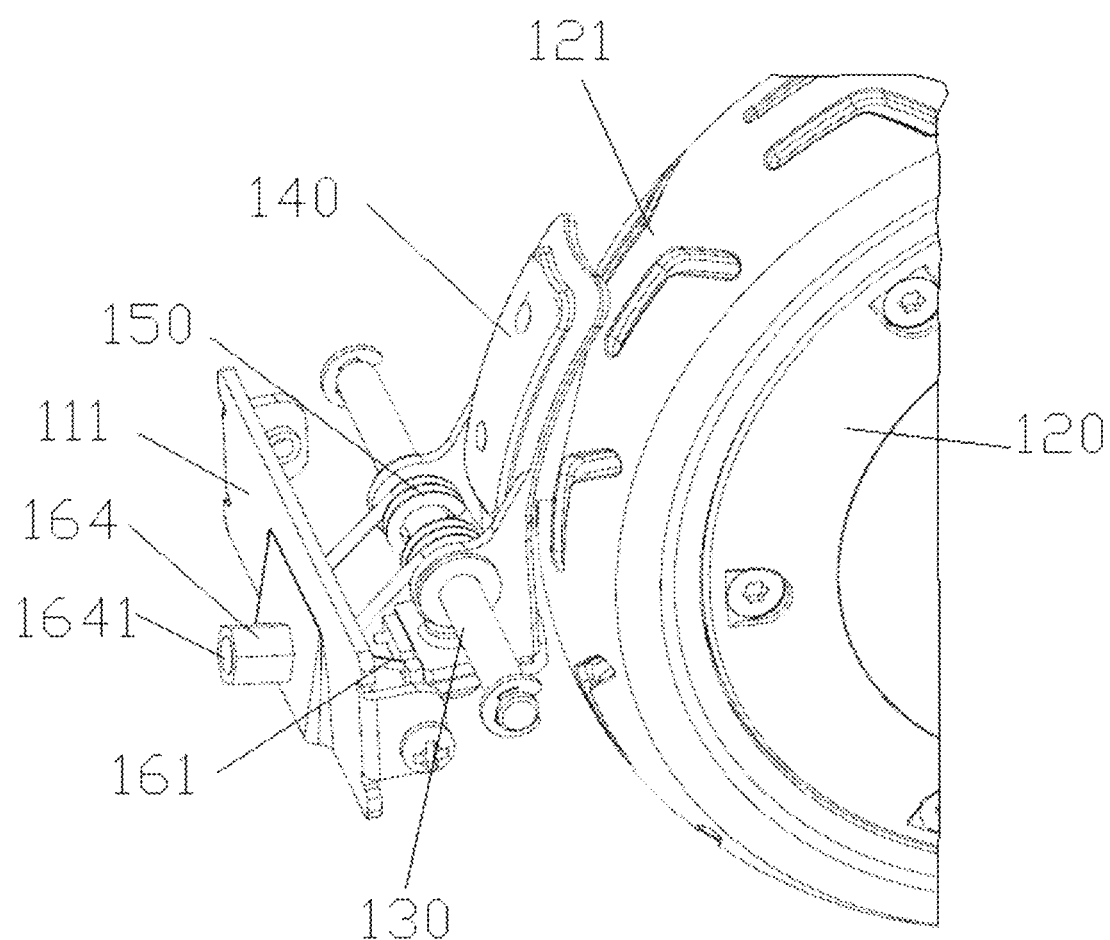
FIG. 1 is a partial view of a traveling apparatus in an embodiment of the present disclosure, showing a wheel body and a brake assembly, in which a frame is hidden and the brake assembly is in an idle position.

The present disclosure will be further described in detail below in combination with accompanying drawings and specific embodiments. It should be understood that the specific embodiments described herein are only used to explain the present disclosure and are not used to limit the present disclosure.

In descriptions of the embodiments of the present disclosure, it should be noted that, unless otherwise specified and limited, the term "connected" should be understood broadly. For example, it may be an electrical connection, or an intercommunication between two elements. It may be a direct connection, or it may be an indirect connection through an intermediate medium. For those skilled in the art, the specific meaning of the above term may be understood according to the specific situation.

It should be noted that the terms "first\second\third" involved in the embodiments of the present disclosure are only to distinguish similar objects, and does not represent a specific order for objects. It can be understood that "first\second\third" may be interchanged with a specific order or sequence if allowed. It should be understood that the objects distinguished by "first\second\third" may be interchanged in appropriate cases, so that the embodiments of the present disclosure described herein can be implemented in an order other than those illustrated or described here.

It should be noted that the embodiments and features in the embodiments of the present disclosure can be combined with each other without conflict.

A traveling apparatus described in the embodiments of the present disclosure is described in detail below in combination with FIGS. 1 to 6.

The traveling apparatus includes: a frame 110, a wheel body 120, a rotating shaft 130, and a brake assembly 140. The wheel body 120 is rotatably arranged to the frame 110, and the wheel body 120 is configured to roll on a bearing surface. The rotating shaft 130 is connected to the frame, and the brake assembly 140 is arranged on the rotating shaft 130 and configured to rotate relative to the frame 110. On a rotation path of the brake assembly 140, the brake assembly 140 has an idle position in which the brake assembly 140 defines a gap with a working surface 121 of the wheel body 120, and a brake position in which the brake assembly 140 is configured to be in contact with the working surface 121 of the wheel body 120. The working surface 121 is a surface of the wheel body 120 configured to be in contact with the bearing surface. When the brake assembly 140 rotates from the idle position to the brake position through the rotating shaft 130, the brake assembly 140 is in contact with the working surface 121, so as to brake the traveling apparatus. An operator does not need to step on a mudguard directly to realize the braking, thus preventing a scooter from shaking due to stepping on the mudguard by the operator, and improving the safety of the traveling apparatus. When the brake assembly 140 rotates from the brake position to the idle position through the rotating shaft 130, the traveling apparatus may switch from a braking state to a normal travelling state, and the brake assembly 140 does not affect the normal travelling of the traveling apparatus.

In the embodiments of the present disclosure, the traveling apparatus may be a balance car or a scooter. However, the present disclosure is not limited to this, and the traveling apparatus may be any other short-distance transportation tools.

In the embodiments of the present disclosure the frame 110 may be a frame of the balance car or a frame of the scooter. However, the frame 110 is not limited to this, and may be frames of any other short-distance transportation tools.

In the embodiments of the present disclosure, the wheel body 120 is configured to roll on the bearing surface. The bearing surface is a surface configured to bear the traveling apparatus. For example, the bearing surface may be the ground.

Here, the wheel body 120 may be rotatably arranged on the frame 110 in various manners. For example, the wheel body 120 may be rotatably arranged on the frame 110 through a shaft structure.

Figure 3:
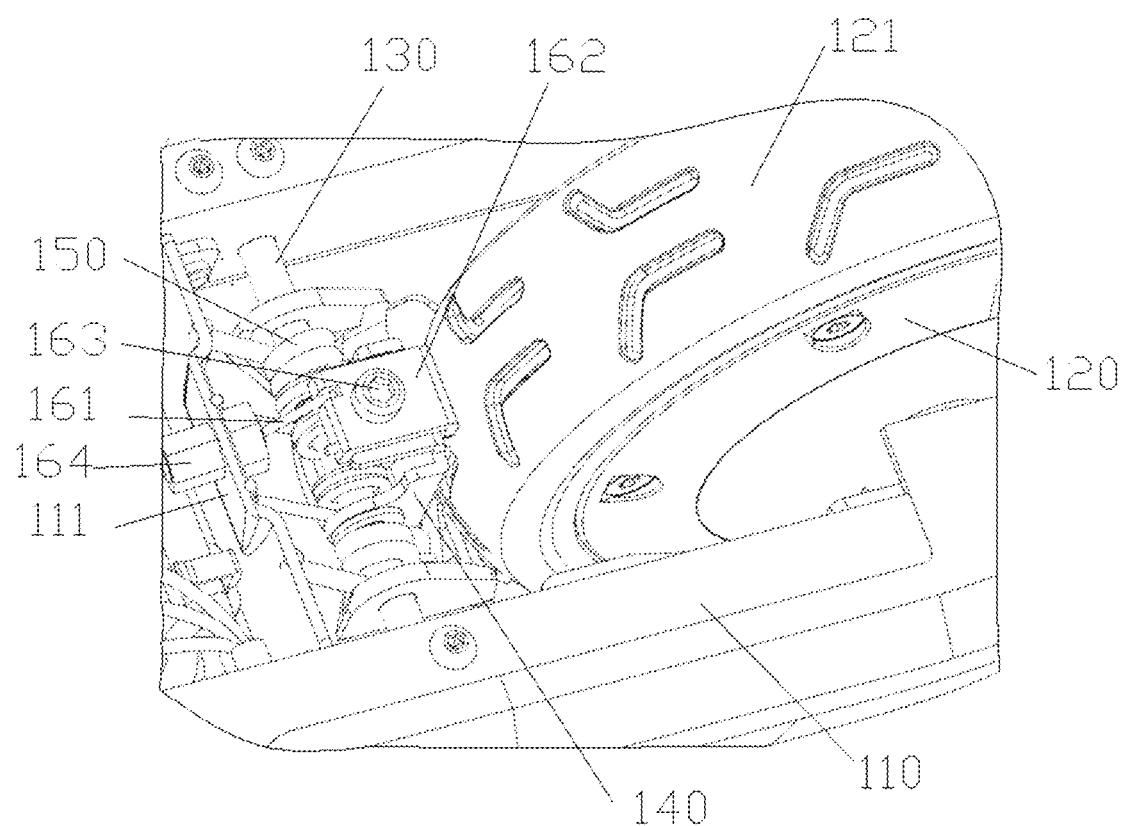
FIG. 3 is a partial bottom view of a traveling apparatus in an embodiment of the present disclosure, showing a wheel body and a brake assembly.
Figure 4:
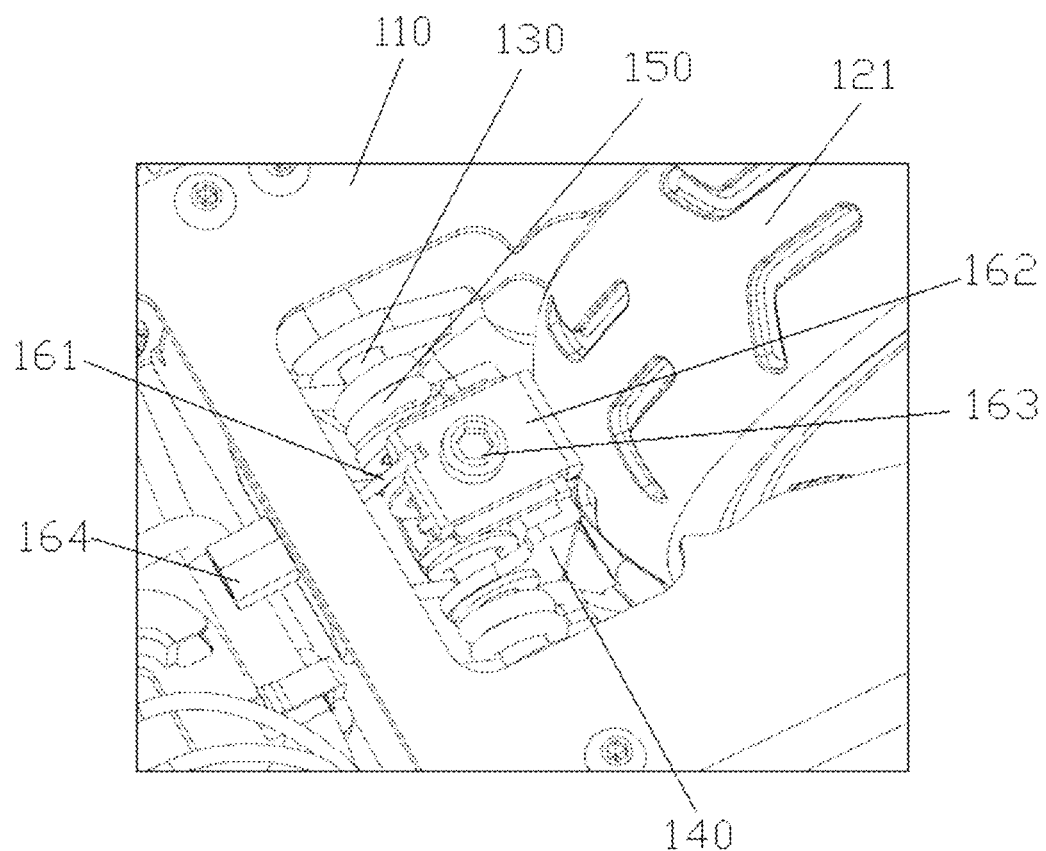
FIG. 4 is a partial bottom view of a traveling apparatus in an embodiment of the present disclosure, showing a wheel body and a brake assembly.

Here, as shown in FIGS. 3 and 4, the working surface 121 is the surface of the wheel body 120 configured to be in contact with the bearing surface, i.e., the surface of the wheel body 120 which is in contact with the bearing surface during the travelling of the traveling apparatus.

Figure 2:
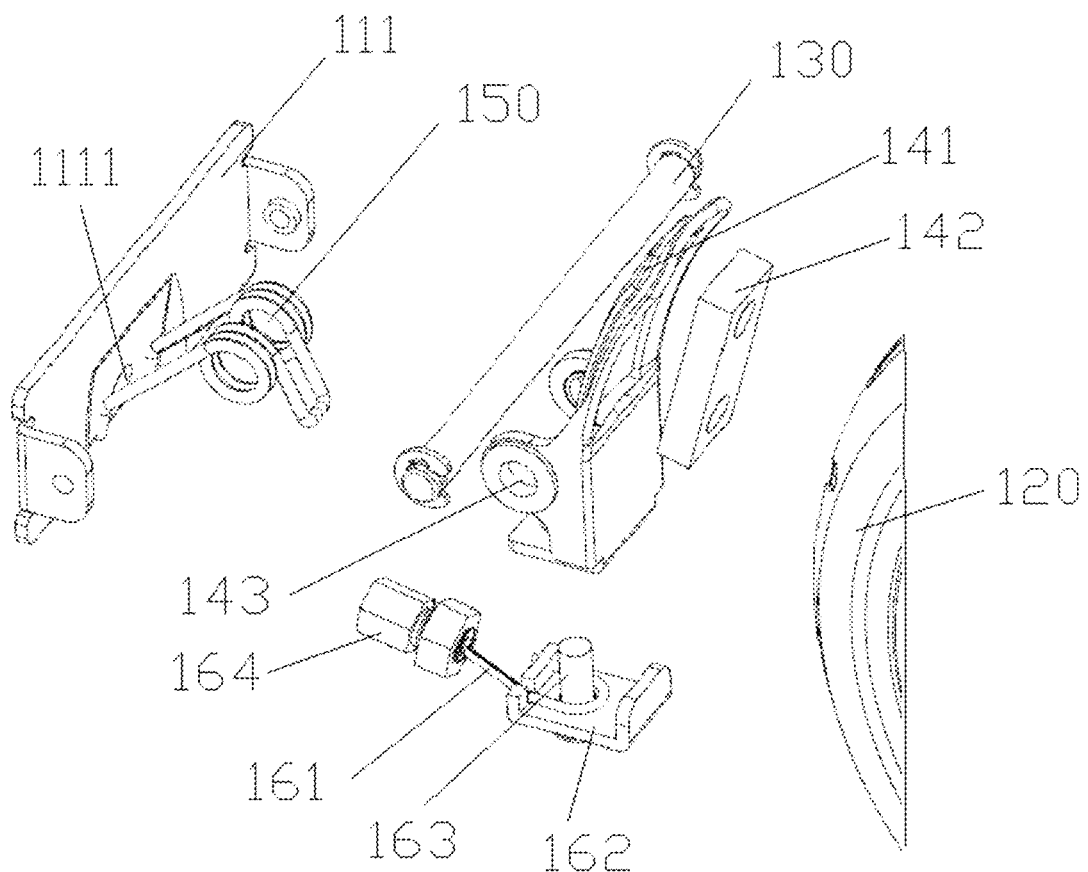
FIG. 2 is a partial exploded view of a traveling apparatus in an embodiment of the present disclosure, showing a wheel body and a brake assembly.

In the embodiments of the present disclosure, as shown in FIG. 2, the brake assembly 140 includes a fixing member 141 and a contact member 142. The fixing member 141 is rotatably arranged on the rotating shaft 130, and the contact member 142 is arranged on the fixing member 141. A surface of the contact member 142 facing towards the wheel body 120 defines a brake surface configured to be in contact with the working surface 121, so as to realize the braking by the contact of the contact member 142 with the working surface 121 of the wheel body 120.

Here, a material of the contact member 142 may be a wear-resistant material. As an example, the contact member 142 may be a rubber member.

Of course, the brake assembly 140 may further be made of the wear-resistant material as a whole.

Here, the brake assembly 140 may be rotatably arranged on the rotating shaft 130 in various manners.

For example, as shown in FIG. 2, the brake assembly 140 has at least one first connecting hole 143, the rotating shaft 130 passes through the at least one first connecting hole 143, and two ends of the rotating shaft 130 are fixedly connected to the frame 110. That is, the brake assembly 140 is configured to rotate around the rotating shaft 130 so as to rotate relative to the frame 110.

Of course, the frame 110 may also has a second connecting hole, the brake assembly 140 may be fixedly connected to the rotating shaft 130, and the rotating shaft 130 passes through the second connecting hole. That is, the rotating shaft 130 is configured to rotate in the second connecting hole, and the brake assembly 140 is configured to rotate together with the rotating shaft 130 so as to rotate relative to the frame 110.

Here, when the brake assembly 140 includes the fixing member 141, the fixing member 141 may have the at least one first connecting hole 143, the rotating shaft 130 passes through the at least one first connecting hole 143, and the two ends of the rotating shaft 130 are fixedly connected to the frame 110, so that the fixing member 141 is rotatably arranged on the rotating shaft 130.

Here, the brake assembly 140 has the idle position in which the brake assembly 140 defines the gap with the working surface 121 of the wheel body 120. During the normal travelling of the traveling apparatus, the contact member 142 is not in contact with the working surface 121 of the wheel body 120 when the brake assembly 140 is in the idle position, so that the travelling of the traveling apparatus is not affected.

In some the embodiments of the present disclosure, the traveling apparatus may further include a restoring member, and the restoring member is arranged between the brake assembly 140 and the frame 110, and configured to drive the brake assembly 140 to rotate from the brake position to the idle position, so as to automatically restore the brake assembly 140 through the restoring member, thus ensuring the normal travelling of the traveling apparatus.

In some embodiments of the present disclosure, the restoring member is a torsion spring 150, and the torsion spring 150 is fitted over the rotating shaft 130. Two abutting ends of the torsion spring 150 abut against the brake assembly 140 and the frame 110, respectively, so as to provide the brake assembly 140 with an elastic restoring force to rotate towards the idle position, thus automatically restoring the brake assembly 140 through the torsion spring 150.

In some embodiments of the present disclosure, the traveling apparatus may further include an operating assembly arranged on the frame 110. The operating assembly has a driving end connected to the brake assembly 140, and the driving end is configured to move relative to the frame 110, so as to drive the brake assembly 140 to rotate to the brake position. The brake assembly 140 may be rotated to the brake position by controlling the movement of the driving end of the operating assembly, thus realizing the braking with the simple operation.

In some embodiments of the present disclosure, the frame 110 may include a frame body and a handle arranged on the frame body. The operating assembly includes a gripping member and a pulling cable 161. The gripping member is arranged on the handle and is configured to rotate relative to the handle. A first end of the pulling cable 161 serves as the driving end and is connected to the brake assembly 140, and a second end of the pulling cable 161 is connected to the gripping member. When the gripping member rotates relative to the handle under an action of an external force, the gripping member drives the brake assembly 140 to rotate to the brake position through the pulling cable 161. When using the traveling apparatus, a user may control the brake assembly 140 to brake by operating the gripping member at the handle, thus facilitating the operation.

In this example, the external force may be a force applied by the operator to the gripping member.

In this example, the gripping member may have various structures. For example, a shape of the gripping member 160 may be similar to a shape of the human hand, so that the human hand may exert the external force on the gripping member 160 easily.

In this example, the gripping member may be rotatably connected to the handle in various manners. For example, the gripping member is rotatably connected to the handle through a shaft structure.

In this example, the pulling cable 161 may be a steel-rope-shaped structure. However, the structure of the pulling cable 161 is not limited to this, and any other suitable structures may also be used.

Figure 5:
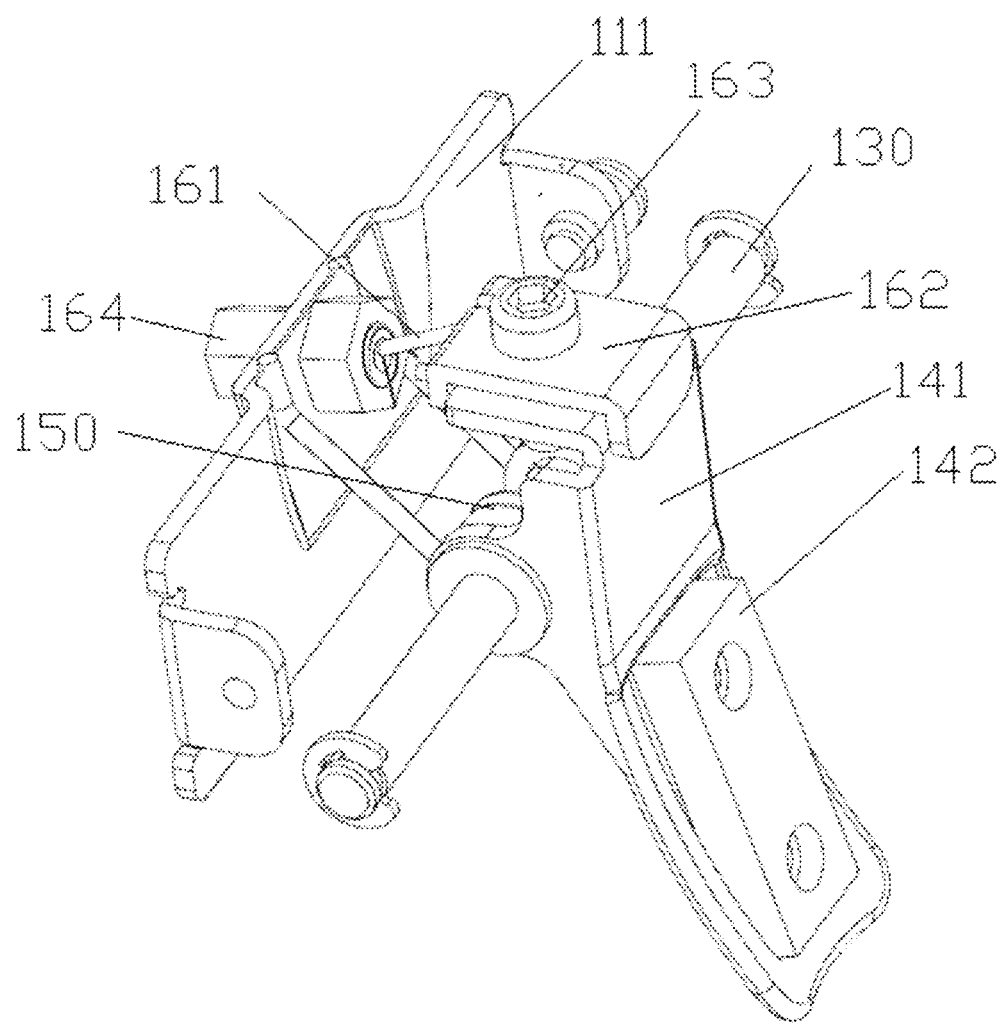
FIG. 5 is a view of a traveling apparatus in an embodiment of the present disclosure, showing a torsion spring and a brake assembly, in which a frame and a wheel body are hidden.

Here, the first end of the pulling cable 161 may be connected to the brake assembly 140 in various manners. For example, as shown in FIGS. 2 and 5, the traveling apparatus may further include a pressing plate 162 and a stud 163. The pressing plate 162 is arranged on the fixing member 141 through the stud 163, the first end of the pulling cable 161 (i.e. the driving end of the operating assembly) is wrapped on the stud 163, and a part of the pulling cable 161 is clamped between the pressing plate 162 and the fixing member 141, so as to fix the first end of the pulling cable 161 wrapped on the stud 163 through the pressing plate 162 and the fixing member 141. Moreover, the stud 163 may be detached from the brake assembly 140, so that it is convenient to adjust a length to be fixed of the first end of the pulling cable 161. For another example, the first end of the pulling cable 161 may also be directly welded to a side of the fixing member 141.

Of course, in this example, the second end of the pulling cable 161 may also be connected to other structures. For example, the second end of the pulling cable 161 may also be arranged at a foot pedal, and the user may step on the second end of the pulling cable 161 at the foot pedal, so that the pulling cable 161 may drive the brake assembly 140 to rotate, so as to realize the braking.

Figure 6:
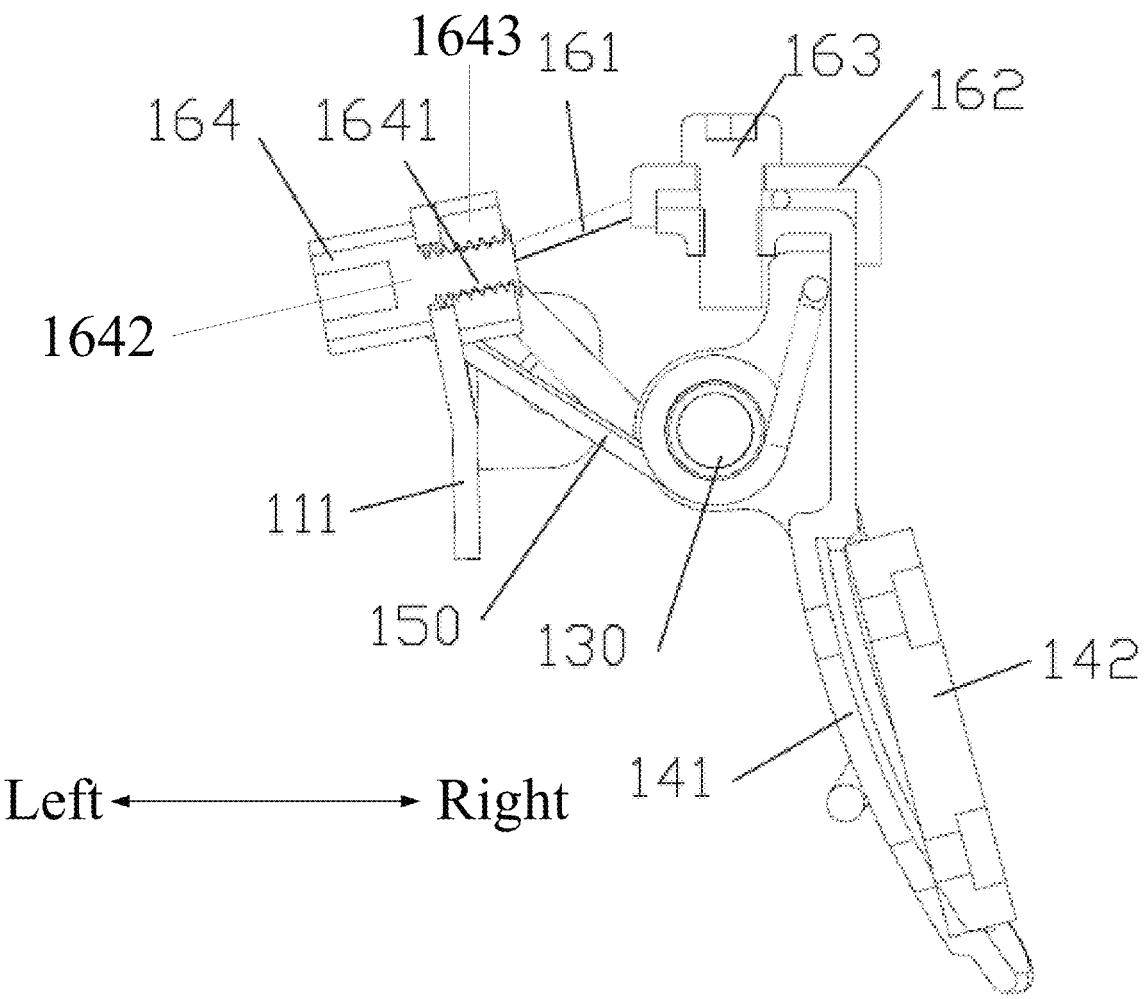
FIG. 6 is a sectional view of a structure in FIG. 5.

In this example, as shown in FIGS. 2 and 6, the frame may further include a support member 111, and the support member 111 is connected to the frame body. The rotating shaft 130 is arranged on the frame body and spaced apart from the support member 111. The support member 111 has a limiting hole 1111, the operating assembly includes a mounting member 164, and the mounting member 164 is arranged on the support member 111 and is located at the limiting hole 1111. The pulling cable 161 passes through a through hole 1641 in the mounting member 164 and then is connected to the gripping member (FIG. 1, FIG. 2, FIG. 5 and FIG. 6 show only a part of the pulling cable 161, i.e., the part between the mounting member 164 and the brake assembly 140).

The first end of the pulling cable 161 passes through the through hole 1641 and is connected to the brake assembly 140. The torsion spring 150 is fitted over an outer side of the rotating shaft 130, a first end of the torsion spring 150 abuts against the support member 111, and a second end of the torsion spring 150 abuts against the brake assembly 140. When the gripping member moves relative to the frame 110 under the action of the external force, the gripping member may drive the brake assembly 140 to rotate to the brake position through the pulling cable 161, and the torsion spring 150 is deformed. When the external force is withdrawn, the brake assembly 140 may rotate to the idle position through the restoring force of the torsion spring 150. Thus, the brake assembly 140 may be controlled by the gripping member, so as to realize the braking, and the brake assembly 140 may be restored by the torsion spring 150, which is flexible for use.

Here, the first end of the pulling cable 161 passes through the through hole 1641, so that the pulling cable 161 may be arranged in a fixed direction, thus preventing the pulling cable 161 from being wound on the wheel body 120, which otherwise will affect the safety of the traveling apparatus.

In the embodiments of the present disclosure, as shown in FIG. 2 and FIG. 5, the support member 111 is a plate-shaped structure. However, the structure of the support member 111 is not limited to this, and any other suitable structures may be used.

Here, the mounting member 164 may have various structures. For example, the mounting member 164 may be a barrel-shaped structure, and the mounting member 164 may be clamped in the limiting hole 1111. For another example, the mounting member 164 may include a first hexagon member 1642 and a second hexagon member 1643, a head (for example, a left end in FIG. 6) of the first hexagon member 1642 is located on a first side of the support member 111, and the second hexagon member 1643 is located on a second side of the support member 111. A tail portion (for example, a right end in FIG. 6) of the first hexagon member 1642 passes through the limiting hole 1111 and is connected to the second hexagon member 1643. In this case, the tail portion of the first hexagon member 1642 may have an external thread, the second hexagon member 1643 may have an internal thread, and the through hole 1641 is formed in the first hexagon member 1642 and the second hexagon member 1633, that is, the through hole 1641 passes through the first hexagon member 1642 and the second hexagon member 1643.

In the traveling apparatus according to the embodiments of the present disclosure, the brake assembly 140 has the idle position in which the brake assembly 140 defines the gap with the working surface 121 of the wheel body 120, and the brake position in which the brake assembly 140 is configured to be in contact with the working surface 121 of the wheel body 120. When the brake assembly 140 rotates from the idle position to the brake position through the rotating shaft 130 (e.g. around the rotating shaft 130), the brake assembly 140 is in contact with the working surface 121, so as to brake the traveling apparatus. The operator does not need to step on the mudguard directly to realize the braking, thus preventing the scooter from shaking due to stepping on the mudguard by the operator, and improving the safety of the traveling apparatus. When the brake assembly 140 rotates from the brake position to the idle position through the rotating shaft 130, the traveling apparatus may switch from the braking state to the normal travelling state, and the brake assembly 140 does not affect the normal travelling of the traveling apparatus.

The above descriptions are only the specific implementations of the present disclosure, and the protection scope of the present disclosure is not limited to this. Those skilled in the art can easily think of changes or alternatives within the technical scope disclosed by the present disclosure, which should be encompassed by the protection scope of the present disclosure. Therefore, the protection scope of the present disclosure shall be subject to the protection scope of the claims.

The invention claimed is:

1. A traveling apparatus, comprising:
a frame;
a wheel body rotatably arranged on the frame, and configured to roll on a bearing surface;
a rotating shaft connected to the frame; and
a brake assembly arranged on the rotating shaft and configured to rotate relative to the frame, wherein on a rotation path of the brake assembly, the brake assembly has an idle position in which the brake assembly defines a gap with a working surface of the wheel body, and a brake position in which the brake assembly is configured to be in contact with the working surface of the wheel body, wherein the working surface is a surface of the wheel body configured to be in contact with the bearing surface, wherein the brake assembly comprises a fixing member and a contact member, the fixing member is rotatably arranged on the rotating shaft, the contact member is arranged on the fixing member, and a surface of the contact member facing towards the wheel body defines a brake surface configured to be in contact with the working surface, wherein the traveling apparatus further comprises an operating assembly arranged on the frame, the operating assembly has a driving end connected to the brake assembly, and the driving end is configured to move relative to the frame, so as to drive the brake assembly to rotate to the brake position, wherein the frame comprises a frame body and a handle arranged on the frame body;

the operating assembly comprises:

a gripping member arranged on the handle and configured to rotate relative to the handle; and a pulling cable having a first end configured as the driving end and connected to the brake assembly, and a second end connected to the gripping member, wherein the gripping member is configured to drive the brake assembly to rotate to the brake position through the pulling cable, when the gripping member rotates relative to the handle under an action of an external force, wherein the brake assembly further comprises a pressing plate and a stud, the pressing plate is arranged on the fixing member through the stud, the first end of the pulling cable is wrapped on the stud, and a part of the pulling cable is clamped between the pressing plate and the fixing member.

2. The traveling apparatus according to claim 1, wherein the fixing member has at least one first connecting hole, the rotating shaft passes through the at least one first connecting hole, and two ends of the rotating shaft are fixedly connected to the frame.

3. The traveling apparatus according to claim 1, wherein the traveling apparatus further comprises a restoring member, and the restoring member is arranged between the brake assembly and the frame, and configured to drive the brake assembly to rotate from the brake position to the idle position.

4. The traveling apparatus according to claim 3, wherein the restoring member is a torsion spring, the torsion spring is fitted over the rotating shaft, and two abutting ends of the torsion spring abut against the brake assembly and the frame, respectively, so as to provide the brake assembly with an elastic restoring force to rotate towards the idle position.

5. The traveling apparatus according to claim 1, wherein the frame further comprises a support member, the support member is connected to the frame body, and the rotating shaft is arranged on the frame body and spaced apart from the support member;

the support member has a limiting hole, the operating assembly comprises a mounting member, the mounting member is arranged on the support member and is located at the limiting hole, and the pulling cable passes through a through hole in the mounting member to be connected to the gripping member.

6. The traveling apparatus according to claim 5, wherein the pulling cable is a steel-rope-shaped structure.

7. The traveling apparatus according to claim 5, wherein the support member is a plate-shaped structure.

8. The traveling apparatus according to claim 5, wherein the mounting member comprises a first hexagon member and a second hexagon member, the first hexagon member comprises a head and a tail portion, the head of the first hexagon member is located on a first side of the support member, the second hexagon member is located on a second side of the support member, and the tail portion of the first hexagon member passes through the limiting hole and is connected to the second hexagon member.

9. The traveling apparatus according to claim 8, wherein the tail portion of the first hexagon member has an external thread, the second hexagon member has an internal thread, the external thread is fitted with the internal thread, and the through hole is formed in the first hexagon member and the second hexagon member.

10. The traveling apparatus according to claim 1, wherein the pulling cable is a steel-rope-shaped structure.

11. The traveling apparatus according to claim 1, wherein the traveling apparatus is configured to be in a braking state when the brake assembly is in the brake position, and to be in a normal travelling state when the brake assembly is in the idle position.

12. The traveling apparatus according to claim 1, wherein the contact member is made of a wear-resistant material.

13. The traveling apparatus according to claim 12, wherein the contact member is a rubber member.

14. A traveling apparatus, comprising:

a frame;

a wheel body rotatably arranged on the frame, and configured to roll on a bearing surface;

a rotating shaft fixedly connected to the frame; and a brake assembly rotatably arranged on the rotating shaft, wherein the brake assembly has an idle position in which the brake assembly is spaced apart from a surface of the wheel body configured to be in contact with the bearing surface, and a brake position in which the brake assembly abuts against the surface of the wheel body, wherein the brake assembly comprises a fixing member and a contact member, the fixing member is rotatably arranged on the rotating shaft, the contact member is arranged on the fixing member, and a surface of the contact member facing towards the wheel body defines a brake surface configured to be in contact with a working surface, wherein the traveling apparatus further comprises an operating assembly arranged on the frame, the operating assembly has a driving end connected to the brake assembly, and the driving end is configured to move relative to the frame, so as to drive the brake assembly to rotate to the brake position, wherein the frame comprises a frame body and a handle arranged on the frame body;

the operating assembly comprises:

a gripping member arranged on the handle and configured to rotate relative to the handle; and a pulling cable having a first end configured as the driving end and connected to the brake assembly, and a second end connected to the gripping member, wherein the gripping member is configured to drive the brake assembly to rotate to the brake position through the pulling cable, when the gripping member rotates relative to the handle under an action of an external force, wherein the brake assembly further comprises a pressing plate and a stud, the pressing plate is arranged on the fixing member through the stud, the first end of the pulling cable is wrapped on the stud, and a part of the pulling cable is clamped between the pressing plate and the fixing member.

15. A traveling apparatus, comprising:
a frame;
a wheel body rotatably arranged on the frame, and configured to roll on a bearing surface;
a rotating shaft connected to the frame; and
a brake assembly arranged on the rotating shaft and configured to rotate relative to the frame, wherein the brake assembly is configured to be spaced apart from a working surface of the wheel body when the traveling apparatus is in a normal travelling state, and to abut against the working surface of the wheel body when the traveling apparatus is in a braking state, wherein the working surface is a surface of the wheel body configured to be in contact with the bearing surface,
wherein the brake assembly comprises a fixing member and a contact member, the fixing member is rotatably arranged on the rotating shaft, the contact member is arranged on the fixing member, and a surface of the contact member facing towards the wheel body defines a brake surface configured to be in contact with the working surface,
wherein the traveling apparatus further comprises an operating assembly arranged on the frame, the operating assembly has a driving end connected to the brake assembly, and the driving end is configured to move relative to the frame, so as to drive the brake assembly to rotate to the brake position,
wherein the frame comprises a frame body and a handle arranged on the frame body;
the operating assembly comprises:
a gripping member arranged on the handle and configured to rotate relative to the handle; and
a pulling cable having a first end configured as the driving end and connected to the brake assembly, and a second end connected to the gripping member, wherein the gripping member is configured to drive the brake assembly to rotate to the brake position through the pulling cable, when the gripping member rotates relative to the handle under an action of an external force,
wherein the brake assembly further comprises a pressing plate and a stud, the pressing plate is arranged on the fixing member through the stud, the first end of the pulling cable is wrapped on the stud, and a part of the pulling cable is clamped between the pressing plate and the fixing member.

* * * * *